Aug. 18, 1964     P. MICHELS     3,144,930

CONVEYOR BELT STRUCTURE

Filed Nov. 21, 1961

United States Patent Office 3,144,930
Patented Aug. 18, 1964

3,144,930
CONVEYOR BELT STRUCTURE
Peter Michels, Hannover, Germany, assignor to Continental Gummi-Werke Aktiengesellschaft, Hannover, Germany
Filed Nov. 21, 1961, Ser. No. 153,932
Claims priority, application Germany Nov. 24, 1960
6 Claims. (Cl. 198—193)

This invention relates to improvements in conveyor belts.

It is conventional to make conveyor belts of elongated strips of relatively flat material which are reinforced by means of longitudinally disposed reinforcing elements. It is known, however, that such belts have little resistance to penetration and ultimate destruction by the objects which are to be conveyed.

Unfortunately, it has been found that providing armour for such belts raises the cost thereof beyond economically feasible limits.

It is, in this respect, an object of the invention to provide the necessary protection for such belts in a manner which permits the ready manufacture of the same without substantially raising the cost thereof.

Another object of the invention is to provide a penetration preventing improvement which operates as well to protect the longitudinally disposed reinforcing elements in belts of the type noted above.

A further object of the invention is to provide improved means for protecting belts without increasing the weight of the same beyond practical limits.

Still another object of the invention is to provide improvements which do not materially alter the flexibility or mobility of the conveyor belts into which these improvements are incorporated.

Principally, the invention is based on the recognition of the fact that belts provided with longitudinal reinforcing elements tend to slash in a longitudinal direction upon being penetrated by any foreign object and that it is only necessary to restrict this longitudinal slashing to retain such belts in useful condition.

In accordance with the above, it is thus proposed to employ transverse reinforcing members to an extent which prevents destruction of the associated belt and only in such quantity and so arranged as to minimize cost and weight increases.

As a feature of the invention, the transverse reinforcing members may be either perpendicular or oblique to the longitudinal reinforcing members and are spaced in entirety from the same. This provides a cushioning layer between the respective types of reinforcing members to minimize the transfer of destructive forces therebetween.

In accordance with the above, and to achieve the foregoing and other of its objectives, the invention contemplates the provision of a conveyor belt comprising an elongated strip of relatively flat material. A plurality of longitudinally disposed metallic reinforcing members or the like is embedded in the strip in accordance with a preferred embodiment of the invention and the strip includes alternating sets of longitudinally arranged sections. The sections of one of these sets is about five to forty times as long as the sections of the other set. The length of the sections in said other set is less than the width of the strip. Second reinforcing members are provided in accordance with the invention in the sections of lesser length and these second reinforcing members are spaced from the first said reinforcing members and are angularly disposed with respect thereto. Moreover, the second reinforcing members are arranged in a plane which is parallel to the first said members.

The above and further objects, advantages and features of the invention will be apparent from the following detailed description of some preferred embodiments, as illustrated in the accompanying drawing, in which:

FIGURE 1 diagrammatically illustrates a conveyor system;

FIGURE 2 is a top plan view of a section of a belt provided in accordance with the invention;

FIGURE 3 diagrammatically illustrates one embodiment of the invention;

As stated above, the invention is principally based upon recognition of the fact that belts provided with longitudinal reinforcing elements tend to slash in a longitudinal direction upon being penetrated by a foreign object. Accordingly, it is only necessary to restrict this longitudinal slashing to retain such belts in useful condition.

To this end, the invention contemplates the use of spaced groups to transverse reinforcing elements which tend to limit the degree to which a belt can be slashed by a foreign object, these groups being longitudinally spaced along the associated belt to minimize the weight increase which they entail, as well as to minimize the attendant cost.

Figure 1:
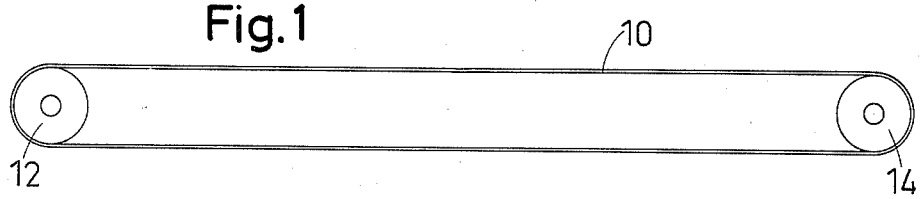

A conveyor system is diagrammatically illustrated in FIG. 1, wherein is shown a belt 10 supported on a driving means constituted, for example, by drive wheels 12 and 14. As is well known, rotation of said drive wheels, one of which may possibly be an idling wheel or the like, drives the belt 10 in a corresponding direction of rotation, the belt 10 being constituted by an endless strip of suitable material.

Figure 2:
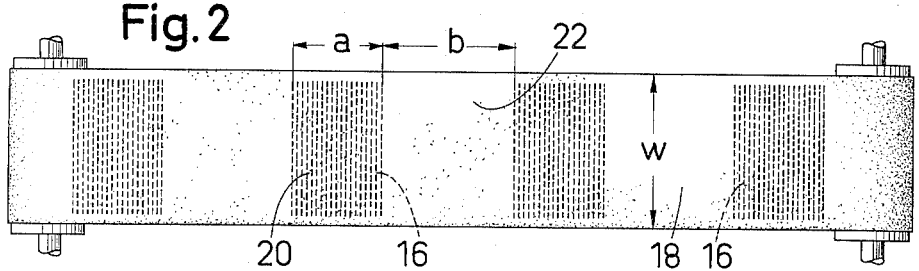

FIG. 2 illustrates generally and diagrammatically the improvement of the invention, transverse elements 16 being shown in hidden view therein.

According to FIG. 2 the belt or strip 18 is constituted by alternate sections 20 and 22, the lengths of which are generally indicated by reference characters $a$ and $b$. Sections 20 alternate down the entire length of strip 18 with sections 22 and both constitute respective groups, the longitudinal extents or lengths of which are correlated in accordance with the invention.

Preferably, in accordance with the invention, the length $a$ of sections 20 is substantially less than the length $b$ of the sections 22. More particularly, each length $b$ is about five to forty times length $a$, and in a preferred embodiment of the invention length $b$ is thirty times length $a$.

Moreover, the width $w$ of strip 18 has a preferred relationship with length $a$, such that width $w$ is greater than length $a$.

Figure 3:
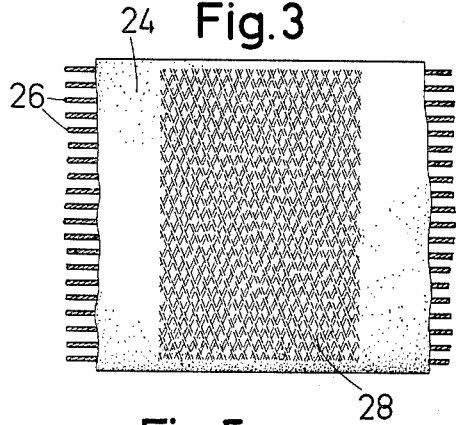

One preferred embodiment of the invention is illustrated in FIG. 3, wherein is shown a strip 24. This strip is preferably fabricated of rubber, plastic or textile fabrics or the like and is generally of a material adapted for resisting wear and of relatively light weight. The material from which strip 24 is fabricated is generally of a character such that it is readily penetrated by foreign objects such as the objects which are to be conveyed.

In known manner there is arranged in the strip 24 a plurality of longitudinally disposed elements 26. The elements 26 are evenly spaced across the strip 24 in parallel coplanar arrangement, the elements 26 consisting of steel cords or the like. The longitudinally disposed reinforcing elements or members 26 enable a tractive force to be applied to the strip or belt 24 in such a manner that the same is longitudinally displaced for purposes of conveying objects placed thereupon.

In accordance with the invention, there are provided transversely aligned reinforcing elements 28, these being located along a relatively short longitudinal extent with respect to the strip 24, as noted above with respect to FIG. 2.

In the embodiment of the invention illustrated in FIG. 3, the transverse reinforcing elements 28 consist of a mesh of obliquely lined wires or cords. These reinforcing elements are preferably fabricated of a metal such as steel or other such metal, but may alternatively be replaced by textile or plastic threads or filaments. Any material may be employed provided that such material is resistant to being severed or penetrated by foreign bodies tending to cut therethrough.

Figure 4:
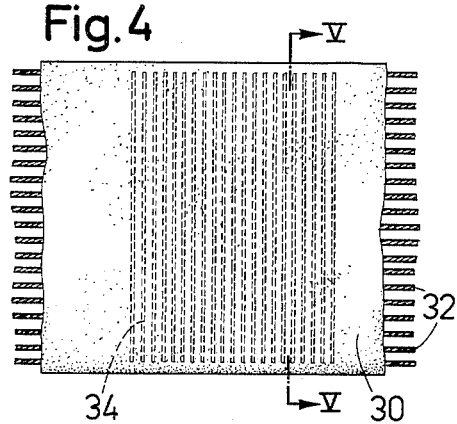
FIGURE 4 illustrates a further embodiment of the invention.

In FIG. 4 is illustrated a further embodiment of the invention consisting of a strip or belt 30 having therein longitudinally disposed reinforcing elements 32 and transversely disposed reinforcing elements 34. Reinforcing elements 34 are arranged in a group as aforesaid and in this embodiment of the invention are arranged perpendicularly with respect to reinforcing elements 32.

Figure 5:
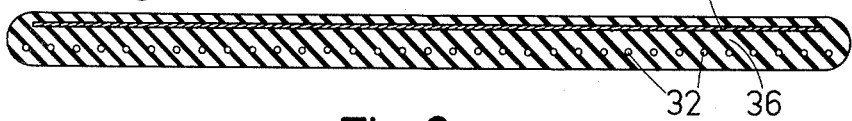
FIGURE 5 is a sectional view on enlarged scale taken along line V—V of FIG. 4.

FIG. 5 is a transverse cross-section of the embodiment of the invention illustrated in FIG. 4. In FIG. 5 is seen the cross-sectional profile of belt 30 and the spaced parallel and coplanar arrangement of longitudinally disposed elements 32.

It is seen in this figure that the reinforcing elements 34 are arranged in a plane spaced above that of the longitudinally disposed reinforcing elements 32, there being formed between the two layers of reinforcing elements a cushion 36 of the material from which the belt 30 is fabricated. This cushion prevents a destructive transfer of forces between the two layers of reinforcing elements, it being appreciated that the reinforcing elements are spaced from each other in entirety.

Figure 6:
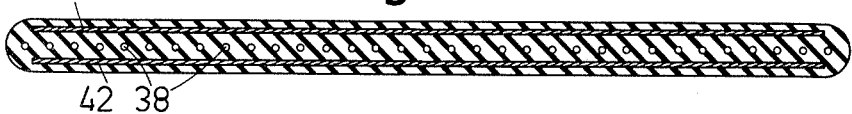
FIGURE 6 is a sectional view corresponding to that of FIG. 5, but illustrating a further embodiment of the invention.

In accordance with the invention, there is further contemplated the type of embodiment illustrated in FIG. 6. It is seen in this figure that the longitudinally disposed reinforcing elements 38 are centered between a first group 40 of transversely aligned reinforcing elements and a second group 42 also formed of transversely aligned reinforcing elements. In this embodiment of the invention the longitudinally disposed reinforcing elements 38 are protected both from above and below from destructive forces.

By reason of providing the transverse reinforcing elements in the manner described above, the strength of the associated belts is vastly improved without tremendously raising the cost thereof beyond economically feasible limits. Moreover, the provisions of the invention secure their objectives without materially increasing the weights of the associated belts.

It is, moreover, apparent that the improvements contemplated by the invention do not materially alter the flexibility or mobility of the belts into which these improvements are incorporated.

There will now be obvious to those skilled in the art many modifications and variations of the structures set forth above. These modifications and variations will not, however, depart from the scope of the invention if defined by the following claims.

What is claimed is:

1. A conveyor belt comprising an elongated strip, spaced longitudinally extending reinforcement members embedded in said strip, and longitudinally spaced groups of transversely disposed reinforcing members embedded in said strip, each group having a longitudinal extent, adjacent groups having a spacing which is between 5 and 40 times the longitudinal extent of each group, said strip having a width which is greater than the longitudinal extent of each group, said reinforcing members in each group lying in coplanar relation, said longitudinally extending reinforcement members lying in a plane spaced from the reinforcing members of the groups such that the reinforcing members in the groups are spaced in entirety from the longitudinally extending reinforcement members.

2. A conveyor belt as claimed in claim 1 wherein said groups of reinforcing members are uniformly distributed along the length of the strip.

3. A conveyor belt as claimed in claim 1 wherein said longitudinally extending reinforcement members are steel cables.

4. A conveyor belt as claimed in claim 1 wherein said transversely disposed reinforcing members extend obliquely with respect to said longitudinally extending reinforcement members.

5. A conveyor belt as claimed in claim 1 wherein said transversely disposed reinforcing members extend perpendicularly to the longitudinally extending reinforcement members.

6. A conveyor belt as claimed in claim 1 wherein said transversely disposed reinforcing members comprise a meshwork of obliquely aligned wires.

References Cited in the file of this patent

UNITED STATES PATENTS

| | | |
|---|---|---|
| 2,114,517 | Apel | Apr. 19, 1938 |
| 2,135,057 | Slayter et al. | Nov. 1, 1938 |
| 2,430,024 | Luaces et al. | Nov. 4, 1947 |
| 2,955,065 | Paul | Oct. 4, 1960 |

FOREIGN PATENTS

| | | |
|---|---|---|
| 564,663 | Germany | Nov. 21, 1932 |
| 426,684 | Great Britain | Apr. 8, 1935 |
| 703,390 | Great Britain | Feb. 3, 1954 |